United States Patent
Liu et al.

(10) Patent No.: US 12,411,955 B2
(45) Date of Patent: Sep. 9, 2025

(54) CONTROL METHOD AND APPARATUS FOR SAFETY BOOT OF CHIP, ELECTRONIC DEVICE AND STORAGE MEDIUM

(71) Applicant: BEIJING HORIZON INFORMATION TECHNOLOGY CO., LTD., Beijing (CN)

(72) Inventors: Qingyu Liu, Beijing (CN); Wenxing Li, Beijing (CN); Jing Li, Beijing (CN); Bo Deng, Beijing (CN); Yichao Lu, Beijing (CN); Zheng Pan, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 18/464,368

(22) Filed: Sep. 11, 2023

(65) Prior Publication Data
US 2024/0152621 A1   May 9, 2024

(30) Foreign Application Priority Data
Nov. 8, 2022   (CN) .......................... 202211394929.8

(51) Int. Cl.
G06F 21/57   (2013.01)
(52) U.S. Cl.
CPC .................................. G06F 21/575 (2013.01)
(58) Field of Classification Search
CPC .................................................. G06F 21/575
See application file for complete search history.

(56) References Cited

U.S. PATENT DOCUMENTS

| | | | | |
|---|---|---|---|---|
| 6,868,492 B1 * | 3/2005 | McCarty | ............... | G06F 9/4411 |
| | | | | 710/36 |
| 7,565,553 B2 * | 7/2009 | Hunter | .................. | G06F 21/575 |
| | | | | 713/192 |

(Continued)

FOREIGN PATENT DOCUMENTS

| | | |
|---|---|---|
| JP | 2007310688 A | 11/2007 |
| JP | 2010140361 A | 6/2010 |
| JP | 2021164009 A | 10/2021 |

OTHER PUBLICATIONS

First Japanese Office action from corresponding Japanese Patent Application No. 2023-147420, mailed on Oct. 8, 2024 (English Translation included).

(Continued)

*Primary Examiner* — Zahid Choudhury
(74) *Attorney, Agent, or Firm* — K&L Gates LLP (57) ABSTRACT

Disclosed are a control method and apparatus for safety boot of a chip, an electronic device and a storage medium. The method includes: determining, at a preset stage of a chip boot process, first mirror data to be checked at the preset stage and first check code corresponding to the first mirror data, from a decryption result obtained by a hardware security module; determining second check code based on the first mirror data; comparing the second check code with the first check code to obtain a comparison result; determining an integrity check result of the first mirror data based on the comparison result; and executing, based on the integrity check result, a safety boot program corresponding to the first mirror data at the preset stage.

16 Claims, 5 Drawing Sheets

(56) References Cited

U.S. PATENT DOCUMENTS

| | | | |
|---|---|---|---|
| 10,680,816 B2* | 6/2020 | Antoni | H04W 4/70 |
| 2010/0153602 A1 | 6/2010 | Kume et al. | |
| 2016/0092687 A1* | 3/2016 | Boenisch | G06F 21/572 |
| | | | 713/2 |
| 2016/0125187 A1* | 5/2016 | Oxford | H04L 63/0442 |
| | | | 713/2 |
| 2018/0157841 A1* | 6/2018 | Shin | G06F 21/44 |
| 2019/0012483 A1* | 1/2019 | Thompson | G06F 21/78 |
| 2019/0266331 A1 | 8/2019 | Sanchez Diaz et al. | |
| 2021/0312055 A1* | 10/2021 | Kloth | H04L 9/0866 |
| 2024/0020386 A1* | 1/2024 | Morita | G06F 21/64 |
| 2024/0126454 A1* | 4/2024 | Kim | G06F 3/0679 |

OTHER PUBLICATIONS

Extended European Search Report from corresponding European Patent Application No. 23197743.0, mailed on Nov. 3, 2024.

* cited by examiner

CONTROL METHOD AND APPARATUS FOR SAFETY BOOT OF CHIP, ELECTRONIC DEVICE AND STORAGE MEDIUM

The present application claims priority to Chinese patent application No. 202211394929.8, filed with the China National Intellectual Property Administration on Nov. 8, 2022 and entitled "CONTROL METHOD AND APPARATUS FOR SAFETY BOOT OF CHIP, ELECTRONIC DEVICE AND STORAGE MEDIUM", disclosure of which is incorporated herein by references in its entirety.

FIELD OF THE INVENTION

The present disclosure relates to technologies of functional safety, and in particular, to a control method and apparatus for safety boot of a chip, an electronic device and a storage medium.

BACKGROUND OF THE INVENTION

Security boot of an intelligent driving chip is implemented mainly based on a conventional in-vehicle MCU (Microcontroller Unit). Specifically, security boot (information security boot) is implemented by an HSM (Hardware Security Module). Because the conventional in-vehicle MCU uses an internal embedded flash, only signature verification (for example, for a signature added based on a private key, signature verification is performed by using a public key) needs to be performed, on data stored in the internal flash, during a boot process, without involving operations of encrypting and decrypting the stored data. Therefore, in the conventional MCU, there is no need to consider a problem of safety boot (functional safety boot), and there are no additional requirements for the HSM on functional safety. However, with development of intelligent driving technologies, advanced processes are widely applied in the intelligent driving chip. As a result, a built-in flash cannot be implemented. Therefore, a current mainstream intelligent driving chip implements nonvolatile storage by using an external flash. According to safety requirements, data stored in the external flash needs to be encrypted for storage. In a safety boot process of the intelligent driving chip, in addition to signature verification, operations of encryption and decryption also need to be performed on the stored data. During a decryption process of the HSM, it is possible to cause a functional safety-related failure to the decrypted data, which may easily result in poor boot safety to the intelligent driving chip.

SUMMARY OF THE INVENTION

To resolve the foregoing technical problem that a safety boot process results in poor boot safety to an intelligent driving chip, the present disclosure is proposed. Embodiments of the present disclosure provide a control method and apparatus for safety boot of a chip, an electronic device and a storage medium.

According to one aspect of an embodiment of the present disclosure, a control method for safety boot of a chip is provided, including: determining, at a preset stage of a chip boot process, first mirror data to be checked at the preset stage and first check code corresponding to the first mirror data, from a decryption result obtained by a hardware security module; determining second check code based on the first mirror data; comparing the second check code with the first check code to obtain a comparison result; determining an integrity check result of the first mirror data based on the comparison result; and executing, based on the integrity check result, a safety boot program corresponding to the first mirror data at the preset stage.

According to another aspect of an embodiment of the present disclosure, a control apparatus for safety boot of a chip is provided, including: a hardware acceleration module, connected to a hardware security module, and configured to determine, at a preset stage of a chip boot process, first mirror data to be checked at the preset stage and first check code corresponding to the first mirror data, from a decryption result obtained by the hardware security module, and to determine second check code based on the first mirror data; a first processing module, connected to the hardware acceleration module, and configured to compare the second check code with the first check code to obtain a comparison result; a second processing module, configured to determine an integrity check result of the first mirror data based on the comparison result; and a third processing module, configured to execute, based on the integrity check result, a safety boot program corresponding to the first mirror data at the preset stage.

According to another aspect of an embodiment of the present disclosure, a computer readable storage medium is provided, on which a computer program is stored, and the computer program is used for implementing the control method for safety boot of a chip described in any one of the foregoing embodiments.

According to still another aspect of an embodiment of the present disclosure, an electronic device is provided, where the electronic device includes: a processor; and a memory configured to store a processor-executable instruction, where the processor is configured to read the executable instruction from the memory and execute the instruction to implement the control method for safety boot of a chip described in any one of the foregoing embodiments; or the electronic device includes the control apparatus for safety boot of a chip described in any one of the foregoing embodiments.

Based on the control method and apparatus for safety boot of a chip, the electronic device, and the storage medium that are provided in the embodiments of the present disclosure, by performing integrity check on the first mirror data in the decryption result obtained by the hardware security module at the preset stage of the chip boot process, it may be ensured that the first mirror data is not damaged through a decryption operation by the hardware security module, thereby ensuring functional safety of the hardware security module and effectively improving safety of chip boot.

The technical solutions of the present disclosure are further described below in detail with reference to the accompanying drawings and the embodiments.

BRIEF DESCRIPTION OF THE DRAWINGS

By describing the embodiments of the present disclosure in more detail with reference to the accompanying drawings, the foregoing and other objectives, features, and advantages of the present disclosure will become more apparent. The accompanying drawings are provided for understanding of the embodiments of the present disclosure well, constituting a part of the specification, and are used to explain the present disclosure together with the embodiments of the present disclosure, not constituting limitation to the present disclosure. In the accompanying drawings, same reference numerals generally indicate same components or steps.

DETAILED DESCRIPTION OF THE EMBODIMENTS

Exemplary embodiments of the present disclosure are described below in detail with reference to the accompanying drawings. Obviously, the described embodiments are merely a part, rather than all, of embodiments of the present disclosure. It should be understood that the present disclosure is not limited by the exemplary embodiments described herein.

It should be noted that the scope of the present disclosure is not limited by relative arrangement, numeric expressions, and numerical values of components and steps described in these embodiments, unless otherwise specified.

A person skilled in the art may understand that terms such as "first" and "second" in the embodiments of the present disclosure are merely used for distinguishing between different steps, devices, or modules, and indicate neither any particular technical meaning, nor necessarily logical ordering among them.

It should be further understood that, in the embodiments of the present disclosure, the term "multiple"/"a plurality of" may refer to two or more; and the term "at least one" may refer to one, two, or more.

The embodiments of the present disclosure may be applicable to a terminal device, a computer system, a server, and other electronic devices, which may be operated together with numerous other general-purpose or special-purpose computing system environments or configurations. Well-known examples of a terminal device, a computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems.

Overview of Present Disclosure

In a process of implementing the present disclosure, the inventor finds that security boot of an intelligent driving chip is implemented mainly based on a conventional in-vehicle MCU (Microcontroller Unit). Specifically, security boot (information security boot) is implemented by an HSM (Hardware Security Module). Because the conventional in-vehicle MCU uses an internal embedded flash, only signature verification (for example, for a signature added based on a private key, signature verification is performed by using a public key) needs to be performed, on data stored in the internal flash, during a boot process, without involving operations of encrypting and decrypting the stored data. Therefore, in the conventional MCU, there is no need to consider a problem of safety boot (functional safety boot), and there are no additional requirements for the HSM on functional safety. However, with development of intelligent driving technologies, advanced processes are widely applied in the intelligent driving chip. As a result, a built-in flash cannot be implemented. Therefore, a current mainstream intelligent driving chip implements nonvolatile storage by using an external flash. According to safety requirements, data stored in the external flash needs to be encrypted for storage. In a safety boot process of the intelligent driving chip, in addition to signature verification, operations of encryption and decryption also need to be performed on the stored data. During a decryption process of the HSM, it is possible to cause a functional safety-related failure to the decrypted data, which may easily result in poor boot safety to the intelligent driving chip.

Exemplary Overview

Figure 1:
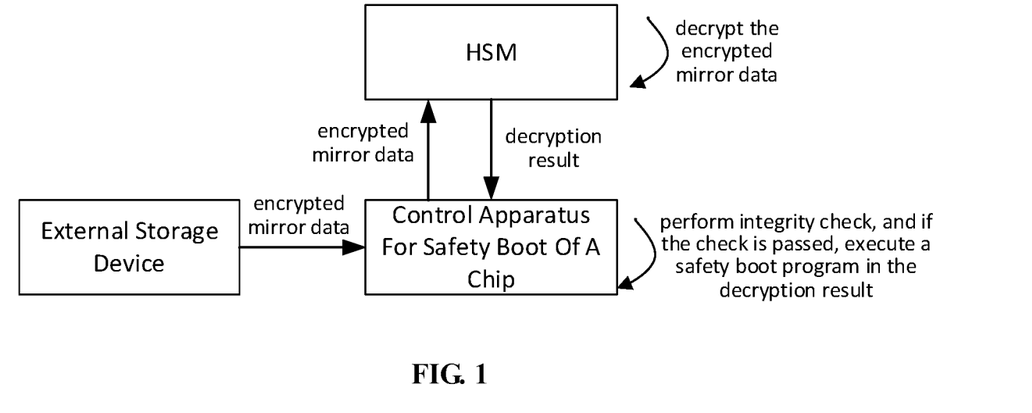
FIG. 1 shows an exemplary application scenario of a control method for safety boot of a chip according to the present disclosure.

FIG. 1 shows an exemplary application scenario of a control method for safety boot of a chip according to the present disclosure.

In an intelligent driving scenario, when booting an intelligent driving chip, an initial boot program pre-stored in an internal read-only memory is acquired first, and is executed to enter subsequent boot stages. For example, a stage of executing the initial boot program may be referred to as a BL0 stage, and the subsequent boot stages includes a BL1 stage and a BL2 stage, which may be set according to actual requirements. Each stage where encrypted mirror data needs to be loaded from an external device may be taken as a preset stage. The encrypted mirror data indicates an encrypted result obtained by encrypting mirror data (which may be referred to as first mirror data) executed at the boot stage, and is used to ensure safety of the mirror data. To perform integrity check on the mirror data subsequently, according to the present disclosure, the mirror data may be encrypted together with first check code of the mirror data to obtain the corresponding encrypted mirror data. The first mirror data indicates a file that includes a safety boot program of a corresponding stage. According to the control method for safety boot of a chip disclosed in the present disclosure (the method is implemented by using a control apparatus for safety boot of a chip), the encrypted mirror data loaded from an external storage device is transmitted to a hardware security module (HSM) at any preset stage. The HSM decrypts the encrypted mirror data to obtain a decryption result. The decryption result includes the first mirror data to be checked at this stage and first check code corresponding to the first mirror data. To perform integrity check on the first mirror data, second check code may be determined based on the first mirror data. The second check code is compared with the first check code to obtain a comparison result. The first check code indicates check code of the first mirror data before the decryption by the HSM, and the second check code indicates check code of the first mirror data after the decryption by the HSM. Therefore, by comparing the first check code and the second check code, if the first mirror data is not damaged through the decryption operation by the HSM, the second check code should be identical to the first check code; and if not, it is indicated that the first mirror data is possibly damaged through the decryption operation by the HSM. On this basis, the integrity check of the first mirror data may be achieved. A corresponding safety boot program is executed merely for the first image data for which a check result is passed. In this way, functional safety of the decryption operation by the HSM may be ensured, and safety boot of the chip is implemented, thereby improving safety of intelligent driving.

Exemplary Method

Figure 2:
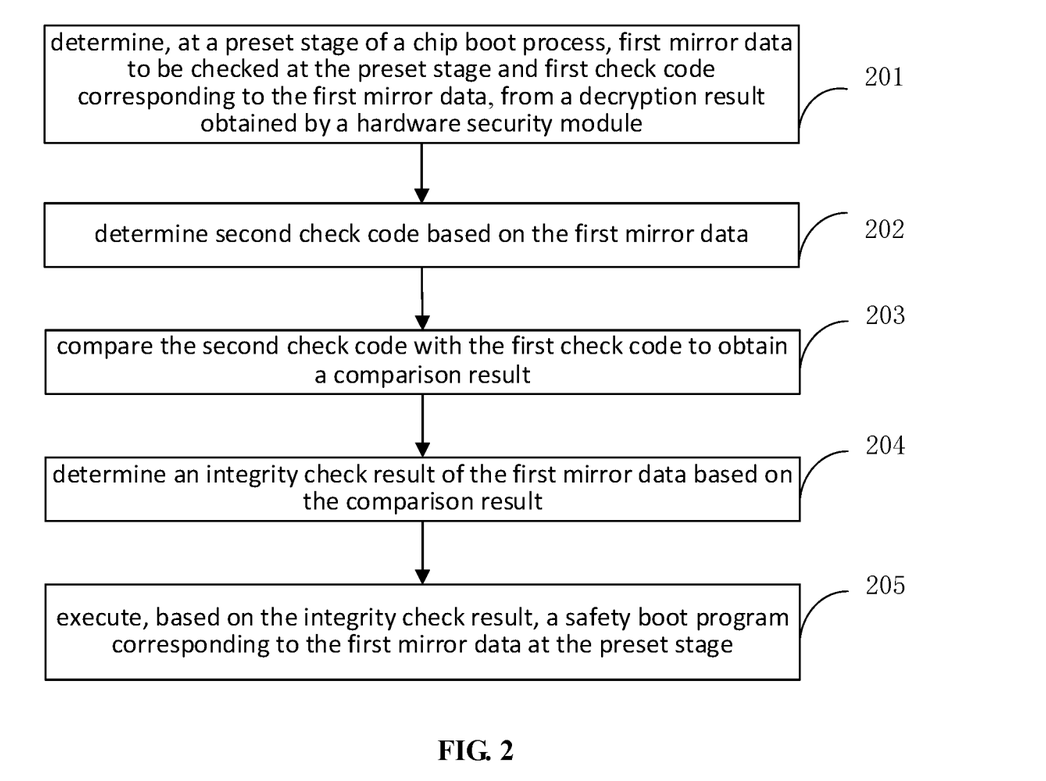
FIG. 2 is a schematic flowchart illustrating a control method for safety boot of a chip according to an exemplary embodiment of the present disclosure.

FIG. 2 is a schematic flowchart illustrating a control method for safety boot of a chip according to an exemplary embodiment of the present disclosure. This embodiment may be applicable to an electronic device, such as an in-vehicle computing platform, for example, a chip such as an intelligent driving chip on the in-vehicle computing platform. As shown in FIG. 2, the following steps are included.

Step 201. Determine, at a preset stage of a chip boot process, first mirror data to be checked at the preset stage and first check code corresponding to the first mirror data, from a decryption result obtained by a hardware security module.

The chip boot process may be set into a plurality of stages according to actual requirements, and different stages may achieve respective corresponding boot functions, which may be set according to actual requirements. For example, after the chip is powered on, the chip boot process may be divided into three stages. At a first stage, a built-in initial boot program of an internal read-only memory is executed first. The initial boot program may be referred to as BL0. Functions implemented at the first stage may include, for example, initializing a system clock, initializing a related external boot device (such as a hardware acceleration module), determining a hardware boot manner, and may further load encrypted mirror data of BL1 (a boot program for initializing a RAM (Random Access Memory) and a serial port, allocating stack space, clearing a BSS segment, and loading a boot program of BL2 (BL2 is a boot program used for initializing hardware to be used at this stage and load a kernel), etc.), and transmit the encrypted mirror data to the hardware security module (HSM). The hardware security module decrypts the encrypted mirror data to obtain the decryption result. Specific operations of decryption may be set according to actual requirements. For example, encryption and decryption are performed based on a symmetric encryption algorithm or an asymmetric encryption algorithm, details of which are not described. After the decryption result is obtained, the first mirror data to be checked at the preset stage and the first check code corresponding to the first mirror data are determined from the decryption result. The first check code indicates check code determined based on the first mirror data and a preset check algorithm prior to the encryption, and is used for subsequent integrity check of the first mirror data. The preset check algorithm may include information, required for generating the check code, such as an algorithm pattern, an initial value, and a calculation length, which may be specifically set according to actual requirements. BL0-BL2 may be set according to actual requirements, which is not limited by the present disclosure.

Similarly, if the boot program of BL1 is executed at the first stage to enter a second stage as the preset stage. At the second stage, the encrypted mirror data for loading the BL2 may be decrypted by using the HSM to obtain the decryption result, so as to determine the first mirror data to be checked at the preset stage and the first check code corresponding to the first mirror data from the decryption result. The others may be deduced by analogy. The method in the present disclosure may be implemented at each preset stage, and details are not described herein again. Just for one preset stage as an example, a subsequent processing process is described below.

In actual applications, specific divisions of the stages of the chip boot process may be set according to actual requirements, which is not limited by the present disclosure.

Step 202. Determine second check code based on the first mirror data.

The second check code indicates check code, for integrity check of the first mirror data, which is generated based on the first mirror data and a preset check algorithm in accordance with that for generation of the first check code after the first mirror data is decrypted by the hardware security module.

Step 203. Compare the second check code with the first check code to obtain a comparison result.

The comparison result may include results that the second check code is the same as or is different from the first check code.

Step 204. Determine an integrity check result of the first mirror data based on the comparison result.

The integrity check result may include two results: passed and not passed. The first check code indicates check code of the first mirror data before the decryption by the HSM, and the second check code indicates check code of the first mirror data after the decryption by the HSM. Therefore, by comparing the first check code and the second check code, if the first mirror data is not damaged through the decryption operation by the HSM or no error occurs, the second check code should be the same as the first check code, indicating that the integrity check result is passed; and if not, it is indicated that the first mirror data may be damaged through the decryption operation by the HSM, and the integrity check result is not passed. On this basis, the integrity check of the first mirror data may be achieved.

Step 205. Execute, based on the integrity check result, a safety boot program corresponding to the first mirror data at the preset stage.

A corresponding safety boot program is executed merely for the first image data for which the check result is passed. In this way, functional safety of the decryption operation by the HSM is ensured, and safety boot of the chip is implemented, thereby improving safety of intelligent driving. If the integrity check result is not passed, the boot process ends.

In practical applications, steps 201 and 202 and steps 203-205 may be implemented by a same processing module or by different processing modules. For example, steps 201 and 202 are implemented by a hardware processing module, while steps 203-205 are implemented by a security core in the chip. The hardware processing module is a hardware circuit independent of the security core, which may be specifically set according to actual requirements.

Based on the control method for safety boot of a chip provided in this embodiment of the present disclosure, by performing integrity check on the first mirror data in the decryption result acquired from the hardware security module at the preset stage of the chip boot process, it may be ensured that the first mirror data is not damaged through the decryption operation by the hardware security module, thereby ensuring functional safety of the hardware security module and effectively improving safety of chip boot.

Figure 3:
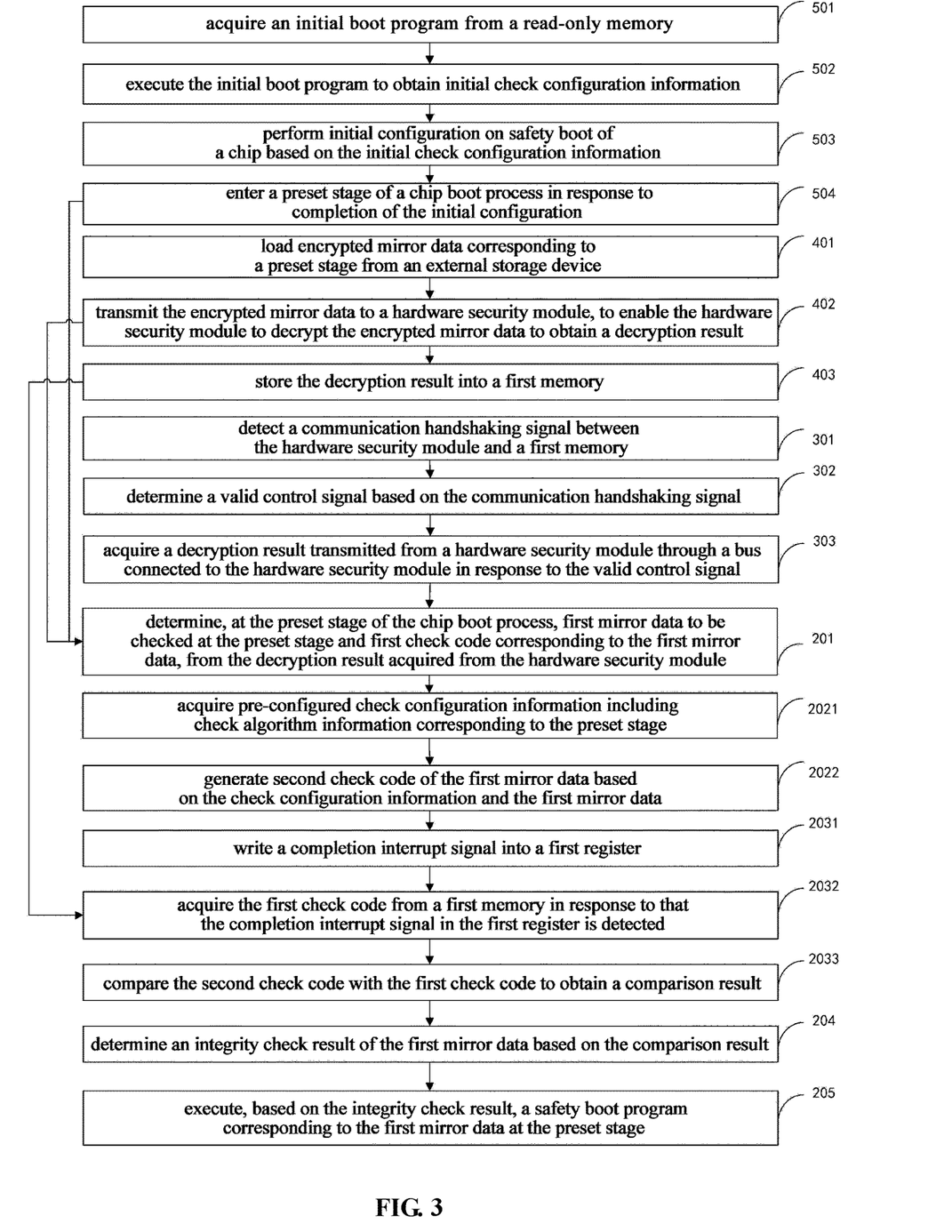
FIG. 3 is a schematic flowchart illustrating a control method for safety boot of a chip according to another exemplary embodiment of the present disclosure.

FIG. 3 is a schematic flowchart illustrating a control method for safety boot of a chip according to another exemplary embodiment of the present disclosure.

In an optional example, before step 201, the method in the present disclosure may further include the following steps.

Step 301. Detect a communication handshaking signal between the hardware security module and a first memory.

The first memory may be a memory within the chip, such as a RAM or a SRAM (Static Random Access Memory). The decryption result obtained through the decryption by the hardware security module needs to be stored into the first memory for reading and executing by a corresponding processor (such as the security core) of the chip. In the present disclosure, the communication handshaking signal between the hardware security module and the first memory is detected to determine when the hardware security module transmits the decryption results to the first memory. The communication handshaking signal may be determined based on an actual handshaking protocol. For example, the communication handshaking signal may include a valid signal (VALID) and a ready signal (READY), which is not specifically limited.

Step 302. Determine a valid control signal based on the communication handshaking signal.

It may be determined, by detecting the communication handshaking signal, when the hardware security module starts to transmit the decryption result. On this basis, the valid control signal may be determined. The valid control signal indicates that it may start to collect or acquire the decryption result transmitted by the hardware security module. For example, when the signals VALID and the READY are detected, it is indicated that handshaking between the hardware security module and the first memory succeeds, and data is ready to be transmitted. In this case, the valid control signal is determined.

Step 303. In response to the valid control signal, obtain the decryption result transmitted by the hardware security module through a bus connected to the hardware security module.

When the valid control signal is determined, it is indicated that acquiring of the decryption result may be started. In this case, the decryption result transmitted by the hardware security module may be acquired through the bus connected to the hardware security module.

In an optional example, the communication handshaking signal between the hardware security module and the first memory may be detected by using a bus bypass. Communication content transmitted between the hardware security module and the first memory through the bus may also be transmitted through the bus bypass, on which a corresponding detection component is provided. The detection component may receive the communication handshaking signal and transmitted data between the hardware security module and the first memory. The valid control signal is used to determine whether to receive and collect data transmitted through a data bus. When there is no valid control signal, the data transmitted through the data bus would not be received. After the valid control signal is determined, it is indicated that the data bus starts to transmit a valid encryption result. Further, the data transmitted through the data bus is received, so that the encryption result transmitted through the data bus may be obtained.

According to the present disclosure, the communication handshaking information between the hardware security module and the first memory is detected, so that the decryption result is acquired through the bus connected to the hardware security module after the valid control signal is determined. In this way, data transmission from the hardware security module to the first memory would not be affected, so that integrity check and storage of the decryption result may be processed in parallel, which effectively improves check efficiency and further reduces time of the chip boot process.

In an optional example, the communication between the hardware security module and the first memory may be bypassed to a hardware processing module (which may be referred to as the hardware acceleration module) through the bus bypass. Integrity check may be performed through hardware, or the second check code may be generated through the hardware, thereby further improving the check efficiency and further improving chip boot efficiency.

In an optional example, before step 201 of determining, from the decryption result acquired from the hardware security module, the first mirror data to be checked at the preset stage and the first check code corresponding to the first mirror data, the method further includes the following steps.

Step 401. Load encrypted mirror data corresponding to the preset stage from an external storage device.

The external storage device indicates a storage device that is external to the chip and that is configured to store the encrypted mirror data. In the chip boot process, only an initial boot program is built in a ROM (Read-Only Memory) within the chip, and all of the boot programs required for boot subsequently need to be loaded from the external into the internal RAM. To ensure safety of the boot program, the encrypted mirror data is usually stored in the external storage device. Therefore, during the boot process, the corresponding encrypted mirror data needs to be loaded from the external storage device at each stage. To obtain true mirror data, decryption processing needs to be performed by using the hardware security module.

Step 402. Transmit the encrypted mirror data to the hardware security module, to enable the hardware security module to decrypt the encrypted mirror data to obtain the decryption result.

Because the decrypt encrypted mirror data needs to be decrypted by the hardware security module, the encrypted mirror data needs to be transmitted to the hardware security module. The encrypted mirror data is acquired by the hardware security module, and is decrypted based on relevant hardware of the hardware security module to obtain the decryption result.

In an optional example, after acquiring the encrypted mirror data, the hardware security module may perform signature verification on the encrypted mirror data. Signature verification refers to verifying legitimacy of data. For example, information, for identifying legitimacy, of the encrypted mirror data, such as a certificate, and a digital signature is carried in a process of loading and transmitting the encrypted mirror data. Alternatively, signature verification may be performed on the first mirror data after the decryption result is obtained through decryption. For example, the decryption result may also include information, for identifying legitimacy, of the encrypted mirror data, such as a certificate, and a digital signature. Signature verification is performed on the first mirror data based on these information, a specific signature verification principle of which is not described in detail.

According to the present disclosure, the encrypted mirror data loaded from the external storage device is decrypted by hardware of the hardware security module, which effectively ensures a decryption speed and real time, thereby ensuring a chip boot speed and reducing time of the chip boot process. Moreover, the external storage device stores encrypted data of the mirror data, thereby further ensuring boot safety of the chip.

In an optional example, the method in the present disclosure further includes:

Step 403. Store the decryption result into a first memory.

The first memory may be a RAM or SRAM within the chip. After the hardware security module achieves decrypting of the encrypted mirror data, the obtained decryption result may be stored in the first memory for use in the chip boot process.

Step 203 of comparing the second check code with the first check code to obtain the comparison result includes the following steps.

Step 2031. Write a completion interrupt signal into a first register.

The completion interrupt signal is used for notifying a relevant processing module (or a submodule) that generation of the second check code has been currently achieved. In this case, after step 202 of determining the second check code of the first mirror data, the completion interrupt signal may also be written into the first register. An apparatus in the present disclosure is provided with a relevant processing module or submodule for responding to interrupts, to detect a state of the first register in a real-time manner or at a regular time.

Step 2032. Acquire the first check code from a first memory in response to that the completion interrupt signal in the first register is detected.

When the completion interrupt signal in the first register is detected, it is indicated that the second check code has been generated. In this case, the first check code may be acquired from the first memory to be compared with the second check code.

Step 2033. Compare the second check code with the first check code to obtain a comparison result.

For example, a check algorithm used for integrity check may be a CRC (Cyclic Redundancy Check) algorithm or a HASH algorithm. For example, for the HASH algorithm, the first check code and the second check code respectively indicate a hash value of the first mirror data before encryption and a hash value of the first mirror data after decryption. Comparing the second check code with the first check code is to determine whether values of the first check code and the second check code are the same, to obtain the comparison result, a specific comparison principle of which is not described in detail.

In an optional example, step 2033 may be implemented by using a hardware comparison circuit, to further improve real time of check.

In an optional example, after being determined, the first check code may further be written into a third register. After being obtained, the second check code may further be written into a fourth register. The third register and the fourth register are respectively connected to input terminals of a comparator for two inputs of the comparator. The second check code is compared with the first check code through the comparator.

In the present disclosure, after the second check code of the first mirror data is generated, the second check code may be compared with the first check code through interrupt response by an interrupt signal to achieve integrity check. Thus, the second check code may be generated by using a module or a submodule independent of the processor, without occupying time of the processor (such as the security core), thereby further reducing time delay of chip boot and improving real time. The second check code may also be compared with the first check code based on hardware, to further improve real time.

In an optional example, step 202 of determining the second check code based on the first mirror data includes the following steps.

Step 2021. Acquire pre-configured check configuration information, where the check configuration information includes check algorithm information corresponding to the preset stage.

The check configuration information may be pre-configured into a storage area, such as, the register. The check algorithm information may include an algorithm pattern, a calculation length, and other related information for check, specific content of which may be determined based on an actual check algorithm, which is not limited by the present disclosure. The algorithm pattern may be a specific check algorithm, such as the CRC algorithm the hash algorithm or the like. The CRC algorithm is to implement error detection by utilizing principles of division and remainders, a specific principle of which is not described in detail. The hash algorithm is to map a binary value with an arbitrary length to a binary value with a shorter fixed length. The shorter binary value is referred to as a hash value, which serve as check code. The calculation length may refer to a length of the check code. For example, for the hash algorithm, a length of the obtained hash value is calculated. Boot processes at different stages may correspond to same or different check configuration information, which may be set according to actual requirements.

Step 2022. Generate the second check code of the first mirror data based on the check configuration information and the first mirror data.

Specifically, a corresponding algorithm is calculated for the first mirror data based on the check algorithm information in the check configuration information, to obtain the second check code.

For example, hash calculation is performed on the first mirror data based on the preset hash algorithm by a calculation length of 8 bits, and a 8-bit binary hash value is obtained as the second check code.

In the present disclosure, the check configuration information is pre-configured to generate the second check code of the first mirror data. A plurality of check algorithms may be supported according to actual requirements, thereby improving generality.

In an optional example, before step 201 of determining, from the decryption result acquired from the hardware security module, the first mirror data to be checked at the preset stage and the first check code corresponding to the first mirror data, the method further includes the following steps.

Step 501. Acquire an initial boot program from a read-only memory.

The read-only memory is a ROM within the chip, and the initial boot program is a boot program pre-built in the read-only memory. After the chip is powered on, the processor or the processor core (such as the security core) related to chip boot first executes the initial boot program in the ROM to start the chip boot process.

Step 502. Execute the initial boot program to obtain initial check configuration information.

The initial boot program has a function of performing some related initialization and configuration. The initial check configuration information may be information built in the ROM along with the initial boot program, and may include the check configuration information corresponding to the encrypted mirror data loaded for executing the initial boot program.

Step 503. Perform initial configuration on the safety boot of the chip based on the initial check configuration information.

The initial configuration may include correspondingly configuring the module or the submodule that is configured to generate the second check code based on the initial check configuration information, such as configuration for a corresponding check algorithm, a calculation length and the like. For example, when a module configured to generate the second check code is a hardware module independent of the security core, the hardware module is configured based on the initial check configuration information, so that the hardware module may achieve the generation of the check code normally. Specific configuration may be set according to actual requirements.

In an optional example, initialization configuration achieved by executing the initial boot program may further include other related initialization and configuration, such as initialization of the related external boot device described above, which may be set according to actual requirements.

Step 504. Enter the preset stage of the chip boot process in response to completion of the initial configuration.

Once the initialization configuration is achieved, there is a need to load encrypted mirror data of a boot program that needs to be executed subsequently. For example, for executing of the initial boot program BL0 described above, the encrypted mirror data of the BL1 may be loaded, and then integrity check of the BL1 is performed at this stage according to the method in the present disclosure. When the check is passed, the safety boot program of BL1 is executed. During a processing of executing the BL1, the encrypted mirror data of the BL2 may be loaded, and then integrity check of the BL2 is performed according to the method in the present disclosure. The others may be deduced by analogy, until all stages of the boot process are completed, that is, the safety boot of the chip is completed.

According to the present disclosure, the initial check configuration information is configured for the safety boot of the chip through the initial boot program, so that integrity check may be performed on the decryption result of the hardware security module through the chip boot, thereby ensuring functional safety of the hardware security module, and improving safety of chip boot.

Any control method for safety boot of a chip provided in the embodiments of the present disclosure may be implemented by any suitable device with a data processing capability, including but not limited to a terminal device and a server. Alternatively, any control method for safety boot of a chip provided in the embodiments of the present disclosure may be implemented by a processor. For example, the processor implements any control method for safety boot of a chip described in the embodiments of the present disclosure by invoking corresponding instructions stored in a memory, details of which are not described below again.

Exemplary Apparatus

Figure 4:
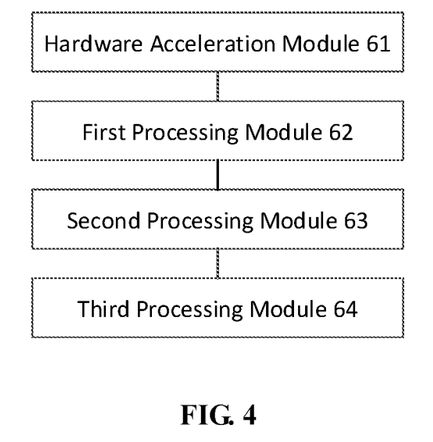
FIG. 4 is a schematic block diagram illustrating a structure of a control apparatus for safety boot of a chip according to an exemplary embodiment of the present disclosure.

FIG. 4 is a schematic block diagram illustrating a structure of a control apparatus for safety boot of a chip according to an exemplary embodiment of the present disclosure. The apparatus in this embodiment may be configured to implement the corresponding method embodiments of the present disclosure. The apparatus shown in FIG. 4 includes a hardware acceleration module 61, a first processing module 62, a second processing module 63, and a third processing module 64.

The hardware acceleration module 61 is connected to a hardware security module; and is configured to determine, at a preset stage of a chip boot process, first mirror data to be checked at the preset stage and first check code corresponding to the first mirror data, from a decryption result obtained by the hardware security module, and determine second check code based on the first mirror data. The first processing module 62 is connected to the hardware acceleration module, and is configured to compare the second check code with the first check code to obtain a comparison result. The second processing module 63 is configured to determine an integrity check result of the first mirror data based on the comparison result. The third processing module 64 is configured to execute, based on the integrity check result, a safety boot program corresponding to the first mirror data at the preset stage.

In an optional example, the first processing module 62, the second processing module 63, and the third processing module 64 may be processor cores for boot in the chip, such as security cores. Performance of the security cores may be set according to actual requirements. For example, a security core with high safety, high reliability, and low latency that meets a safety level (such as ASILD (Automotive Safety Integrity Level D)) may be established based on a low-latency processor core.

In an optional example, the hardware acceleration module 61 and/or the first processing module 62 may be software modules or may be hardware circuit modules, which may be specifically set according to actual requirements.

In an optional example, the hardware acceleration module 61 may be connected to the first processing module 62, the second processing module 63, and the third processing module 64 through buses.

According to the present disclosure, by performing integrity check on the first mirror data in the decryption result acquired from the hardware security module at the preset stage of the chip boot process, it may be ensured that the first mirror data is not damaged through a decryption operation by the hardware security module, thereby ensuring functional safety of the hardware security module, and effectively improving safety of chip boot.

Figure 5:
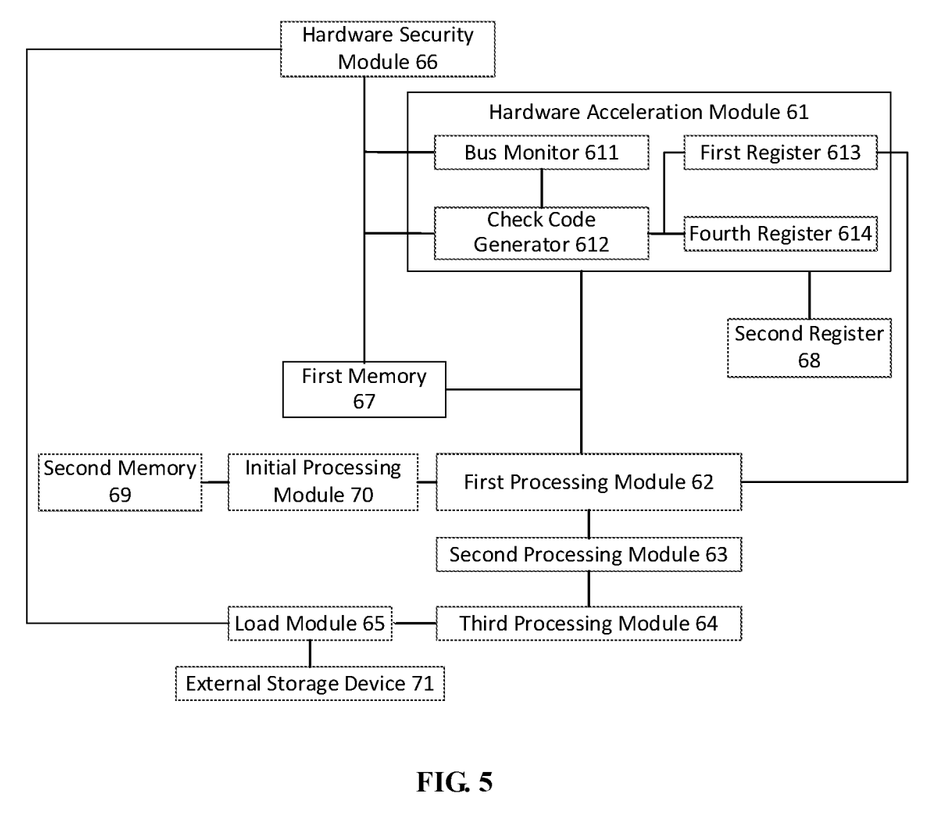
FIG. 5 is a schematic block diagram illustrating a structure of a control apparatus for safety boot of a chip according to another exemplary embodiment of the present disclosure.

FIG. 5 is a schematic block diagram illustrating a structure of a control apparatus for safety boot of a chip according to another exemplary embodiment of the present disclosure.

In an optional example, the hardware acceleration module 61 includes a bus monitor 611 and a check code generator 612. The bus monitor 611 is connected to the hardware security module by a bus bypass; and is configured to detect a communication handshaking signal between the hardware security module and a first memory, and transmit a valid control signal to the check code generator based on the communication handshaking signal, where the valid control signal is used for notifying the check code generator to start to collect the decryption result transmitted by the hardware security module. The check code generator 612 is connected to the bus monitor 611; is further connected to the hardware security module by a bus bypass; and is configured to collect, in response to the valid control signal from the bus monitor, the decryption result transmitted by the hardware security module through a bus connected to the hardware security module, and determine the second check code based on the first mirror data in the decryption result.

Since the communication handshaking signal is a control signal, the bus monitor 611 may be connected to a control bus of the bus bypass to monitor the communication handshaking signal. The check code generator 612 is configured to collect data of the transmitted decryption result, and therefore may be connected to a data bus of the bus bypass, which may be specifically set according to actual requirements, as long as corresponding functions may be implemented. A function of the bus bypass is to enable communication content of the hardware security module and the first memory to be transmitted to the hardware acceleration module 61 in parallel through the bus bypass, to detect the communication handshaking signal in a real-time manner and collect the decryption result in a real-time manner. For a meaning of the valid control signal, refer to the foregoing method embodiments, and details are not described herein again. For specific operations of the check code generator 612 after the decryption result is obtained, refer to the foregoing method embodiments In an optional example, the bus monitor 611 and the check code generator 612 may be implemented through hardware, to further improve real time.

According to the present disclosure, calculation of check code of to-be-checked mirror data in the decryption result is performed through the bus bypass, which does not affect other circuits on a bus path. Moreover, rapid calculation of the check code of the to-be-checked mirror data in the decryption result of the hardware security module may be achieved through hardware; further, the check code obtained through calculation is compared with the check code in the decryption result through a safety processing module, to determine integrity of the mirror data, without occupying calculation time of software or causing additional delays on a hardware path. In this way, while ensuring that requirements for a certain safety level are met, time of an overall boot process is effectively reduced, thereby improving a boot speed.

In an optional example, the apparatus in the present disclosure further includes a load module 65 and a hardware security module 66.

The load module 65 is configured to load encrypted mirror data corresponding to the preset stage from an external storage device. The hardware security module 66 is connected to the load module 65, and is configured to decrypt the encrypted mirror data to obtain the decryption result.

In an optional example, the load module 65 may be connected to the hardware security module 66 through a bus. Alternatively, the load module 65, as a module in a processor or a processor core, is connected to the bus by the processor or the processor core, and then is connected to the hardware security module 66, which may be set according to actual requirements.

According to the present disclosure, by loading encrypted mirror data for a to-be-executed safety boot program stored in the external storage device into the chip at the preset stage, the chip may decrypt the encrypted mirror data through the hardware security module to obtain mirror data for the to-be-executed safety boot program, thereby providing an external storage function for chip boot and reducing internal storage costs of the chip.

In an optional example, the apparatus in the present disclosure further includes a first memory 67. The hardware security module 66 is further configured to store the decryption result into the first memory 67.

The first memory 67 may be a RAM or SRAM within the chip, and the hardware security module 66 may communicate with the first memory 67 through the bus.

In an optional example, the hardware acceleration module 61 further includes a first register 613 that is connected to the first processing module 62, and is configured to store a completion interrupt signal. The hardware acceleration module 61 is further configured to write the completion interrupt signal into the first register 613 after determining the second check code, to notify the first processing module 62 that the second check code has been generated. The first processing module 62 is further configured to acquire the first check code from the first memory 67 in response to that the completion interrupt signal in the first register 613 is detected, and compare the second check code with the first check code to obtain the comparison result.

The first register 613 may be any implementable register. For example, an original register in the chip may be used or a register may be added according to requirements of the present disclosure, which may be specifically set according to actual requirements. The hardware acceleration module 61 or the foregoing check code generator 612 may write the second check code into the first register 613 after generating the second check code, to notify the first processing module 62 that the second check code has been generated. The first processing module 62 may detect the first register 613 in a real-time manner or at a regular time, to compare the second check code with the first check code in response to the completion interrupt signal, so as to achieve the integrity check.

In an optional example, a comparator may also be included in the hardware acceleration module 61 to compare the second check code with the first check code. The comparison result may also be stored by a corresponding comparison result register. The comparison result register may be connected to the first processing module 62, so that the first processing module 62 may acquire directly the comparison result, thereby further improving real time of integrity check.

According to the present disclosure, the completion interrupt signal is stored by using the first register, so that the generation of the check code may be independent of the processor. After the check code is generated, an interrupt request is transmitted to the processor through the completion interrupt signal, so that the processor responds to the interrupt request and determine the integrity check result, thereby further improving the real time.

In an optional example, the apparatus in the present disclosure further includes a second register 68 that is connected to the hardware acceleration module 61, and is configured to store check configuration information. The check configuration information includes check algorithm information corresponding to this stage. The hardware acceleration module 61 is further configured to acquire the check configuration information from the second register 68, and generate the second check code of the first mirror data based on the check configuration information and the first mirror data.

The second register 68 may be any implementable register, which may be specifically set according to actual requirements. Content stored in the second register 68 may be configured at any time before the integrity check of the boot process, which may be specifically set according to actual requirements. Optionally, the check configuration information for each stage may also be pre-stored in the ROM in the chip along with initial boot code, which is not specifically limited. For specific content and an operating principle of the check configuration information, refer to the foregoing embodiments, and details are not described herein again.

According to the present disclosure, the check configuration information for the preset stage is stored by using the second register, so as to support the integrity check of the first mirror data that is decrypted at the preset stage, thereby ensuring rapid generation of the check code and further improving the real time.

In an optional example, the apparatus in the present disclosure further includes a second memory 69 and an initial processing module 70. The second memory 69 is configured to store an initial boot program and initial check configuration information for the hardware acceleration module 61. The initial processing module 70 is configured to execute the initial boot program stored by the second memory 69 to enter an initial boot stage, acquire the initial check configuration information from the second memory 69 based on the initial boot program, and perform initial configuration on the hardware acceleration module 61 based on the initial check configuration information to enter the preset stage of the chip boot process.

The second memory 69 may be a read-only memory (ROM) in the chip. The initial boot program is pre-built in the ROM. After the chip is powered on, the initial processing module 70 starts to operate and executes the initial boot program in the ROM. The initial boot program performs initial configuration on the hardware acceleration module 61 to enable the hardware acceleration module 61 to operate normally. Certainly, configurations for other related modules or functions of the chip may also be included, and it is guided to enter the preset stage of the boot process. Corresponding boot operation at this stage is completed at the preset stage, including loading the encrypted mirror data from the external storage device and transmitting the encrypted mirror data to the hardware security module 66 for decryption. The decryption result decrypted by the hardware security module 66 is transmitted to the first memory 67 and the hardware acceleration module 61 through the bus and the bus bypass, respectively. The hardware acceleration module 61 acquires the decryption result, generates the second check code of the first mirror data in the decryption result based on the check configuration information for this stage that is stored in the second register 68, and writes the completion interrupt signal into the first register 613, to notify the first processing module 62. The first processing module 62 acquires the first check code in the decryption result from the first memory 67, acquires the second check code from the hardware security module, and compares the second check code with the first check code to obtain the comparison result. Further, the integrity check result is determined based on the comparison result. In response to pass of the integrity check result, the safety boot program corresponding to the first mirror data is executed. For a specific principle, refer to the foregoing embodiments, and details are not described herein again.

According to the present disclosure, the initial boot program is pre-stored in the read-only memory of the chip, so that after the chip is powered on, the related processor core (such as the security core) for boot may first execute the initial boot program in the read-only memory to enter an initial boot process of the chip, thereby guiding the chip to enter a subsequent boot stage to implement safety boot of the chip.

In an optional example, the hardware acceleration module 61 may further include:

a fourth register 614 that is connected to the check code generator 612, and is configured to store the second check code; and a check code generator 612 that is further configured to write the second check code into the fourth register 614.

The fourth register 614 may be any implementable register, which may be specifically set according to actual requirements.

Figure 6:
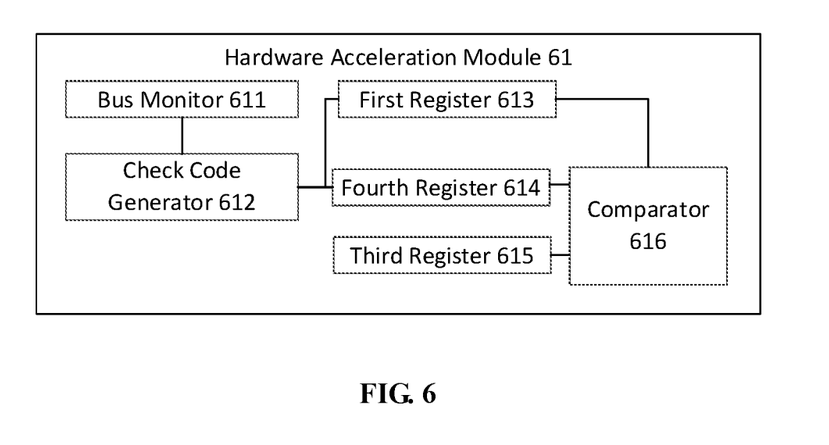
FIG. 6 is a schematic block diagram illustrating a structure of a hardware acceleration module according to an exemplary embodiment of the present disclosure.

In an optional example, FIG. 6 is a schematic block diagram illustrating a structure of a hardware acceleration module 61 according to an exemplary embodiment of the present disclosure. In this example, the hardware acceleration module 61 may be entirely or partially implemented by hardware. The hardware acceleration module 61 may further include a third register 615 and a comparator 616. The third register 615 is configured to store the first check code. The third register 615 and the fourth register 614 may be respectively connected to input terminals of the comparator 616, so that the second check code is compared with the first check code through hardware, to further improve real time of check. If the comparator 616 is connected to the first register 613, the comparison result of the comparator 616 may be carried in the completion interrupt signal. In this case, the completion interrupt signal may be transmitted to first processing module 62 along with the comparison result. The first processing module 62 may respond to an interrupt and directly determine the integrity check result based on the comparison result, thereby further improving the real time of the check.

In an optional example, the apparatus in the present disclosure further includes an external storage device 71 that is configured to store the encrypted mirror data.

Figure 7:
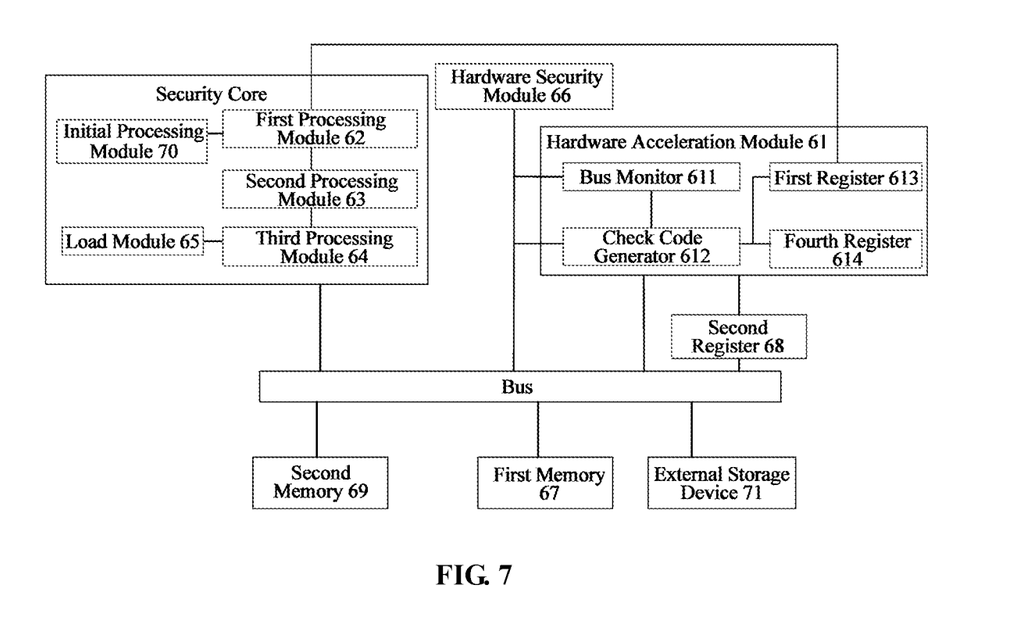
FIG. 7 is a schematic block diagram illustrating a structure of a control apparatus for safety boot of a chip according to still another exemplary embodiment of the present disclosure.

FIG. 7 is a schematic block diagram illustrating a structure of a control apparatus for safety boot of a chip according to still another exemplary embodiment of the present disclosure. In this example, the first processing module 62, the second processing module 63, the third processing module 64, the load module 65, and the initial processing module 70 described above are modules in the security core of the chip. The hardware acceleration module 61 is a hardware module independent of the security core. The security core, the hardware security module 66, the hardware acceleration module 61, the first memory 67, the second memory 69, and an external memory 71 are interconnected with each through buses. When the chip is powered on, the security core boots the initial boot program built in the second memory 69 to perform initial configuration on the hardware acceleration module 61, so that the hardware acceleration module 61 operates normally. After the boot process enters the preset stage, the security core loads the encrypted mirror data corresponding to the preset stage from the external memory 71 and transmits the encrypted mirror data to the hardware security module 66 through the bus. The hardware security module 66 decrypts (decryption may also be performed after signature verification is performed) the encrypted mirror data to obtain the decryption result, and writes the decryption result into the first memory 67 through the bus. The hardware acceleration module 61 monitors the communication handshaking signal between the hardware security module 66 and the first memory 67 through the bus bypass; acquires the decryption result transmitted through the bus after the valid control signal is determined; generates the second check code of the first mirror data based on the pre-configured check configuration information in the second register 68; writes the second check code into the fourth register 614; and after generating the second check code, writes the completion interrupt signal into the first register 613 to notify the security core that the second check code has been generated. The security core responds to the completion interrupt signal, acquires the first check code from the first memory 67 through the bus, and acquires the second check code from the fourth register 614. The second check code is compared with the first check code to obtain the comparison result. Thus, the integrity check result is determined based on the comparison result, and the safety boot program corresponding to the first mirror data is executed in response to pass of the integrity check result.

According to the present disclosure, the decryption result of the hardware security module is acquired through the bus bypass, and the second check code is generated through hardware. In this way, processing time may be greatly reduced as compared with calculating of the second check code by using safety-core software. In this way, real time is effectively improved, thereby effectively improving a safety boot speed of the chip while ensuring the safety boot of the chip.

Figure 8:
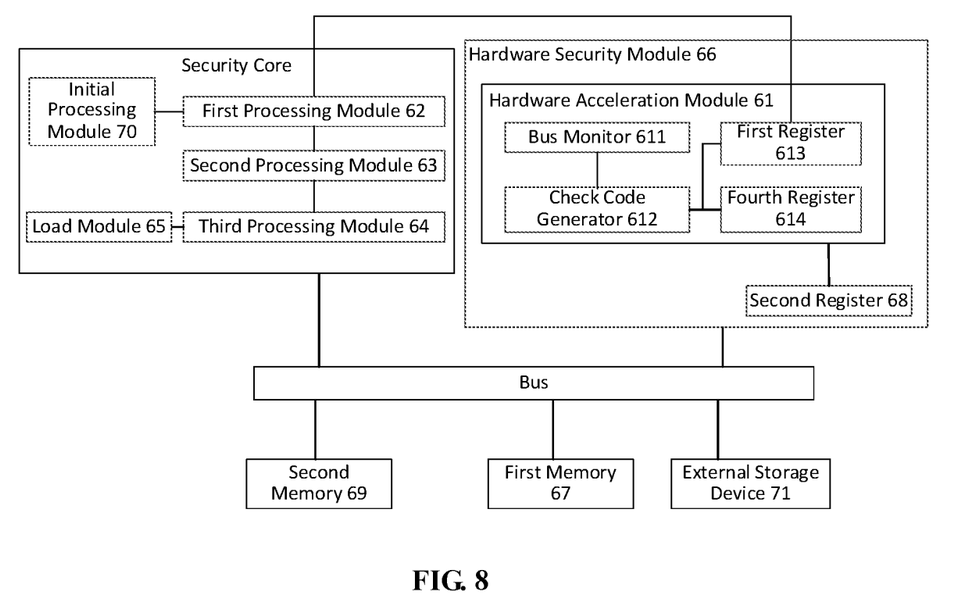
FIG. 8 is a schematic block diagram illustrating a structure of a control apparatus for safety boot of a chip according to yet another exemplary embodiment of the present disclosure.

In an optional example, FIG. 8 is a schematic block diagram illustrating a structure of a control apparatus for safety boot of a chip according to yet another exemplary embodiment of the present disclosure. In this example, the hardware acceleration module 61 and the second register 68 may be disposed within the hardware security module 66. The decryption result of the hardware security module 66 is transmitted to the first memory 67 through the bus on the one hand, and is transmitted to the hardware acceleration module 61 on the other hand. The hardware acceleration module 61 generates the second check code of the first mirror data, writes the second check code into the fourth register 614, and writes the completion interrupt signal into the first register 613 to notify the security core to perform subsequent comparison and other related processing. For details, refer to the foregoing example, and details are not described herein again.

In an optional example, when the integrity check result of the first mirror data at the preset stage is not passed, the safety boot of the chip fails and recovery operations may be performed. For example, recovery is performed through software or by notifying the external, and a new safety boot process is started.

According to the present disclosure, the integrity check is performed through the bus bypass and the hardware acceleration module, which does not cause additional delays on the hardware path of the chip and does not affect other circuits. The check code may also be calculated rapidly based on the hardware, which may further reduce the boot time as compared with performing the integrity check by using processor software. Moreover, compared with performing integrity check on the decryption result through redundancy setting of hardware security modules (that is, two hardware security modules are provided for decryption, wherein decryption results of the two hardware security modules are compared, and if the decryption results are identical, it is considered that the check is passed, and otherwise it is considered that the check is not passed), the present disclosure may effectively reduce hardware costs.

Exemplary Electronic Device

An embodiment of the present disclosure further provides an electronic device, including: a memory, configured to store a computer program; and     a processor, configured to execute the computer program stored in the memory, where when the computer program is executed, the control method for safety boot of a chip according to any one of the foregoing embodiments of the present disclosure is implemented.

Figure 9:
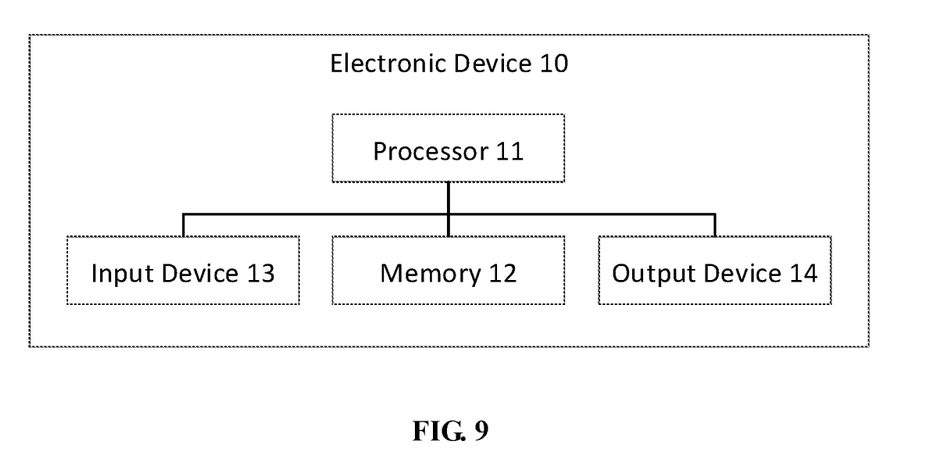
FIG. 9 is a schematic block diagram illustrating a structure of an electronic device according to an application embodiment of the present disclosure.

FIG. 9 is a schematic block diagram illustrating a structure of an electronic device according to an application embodiment of the present disclosure. In this embodiment, an electronic device 10 includes one or more processors 11 and a memory 12.

The processor 11 may be a central processing unit (CPU) or another form of processing unit having a data processing capability and/or an instruction execution capability, and may control another component in the electronic device 10 to perform a desired function.

The memory 12 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 11 may execute the program instruction to implement the method according to various embodiments of the present disclosure that are described above and/or other desired functions. Various contents such as an input signal, a signal component, and a noise component may also be stored in the computer readable storage medium.

In an example, the electronic device 10 may further include an input device 13 and an output device 14. These components are connected to each other through a bus system and/or another form of connection mechanism (not shown).

For example, the input device 13 may be a microphone or a microphone array, which is configured to capture an input signal of a sound source.

In addition, the input device 13 may further include, for example, a keyboard and a mouse.

The output device 14 may output various information to the outside, including determined distance information, direction information, and the like. The output device 14 may include, for example, a display, a speaker, a printer, a communication network, and a remote output device connected by the communication network.

Certainly, for simplicity, FIG. 9 shows only some of components in the electronic device 10 that are related to the present disclosure, and components such as a bus and an input/output interface are omitted. In addition, according to specific application situations, the electronic device 10 may further include any other appropriate components.

Exemplary Computer Program Product And Computer Readable Storage Medium

In addition to the foregoing method and device, the embodiments of the present disclosure may also relate to a computer program product, which includes computer program instructions. When the computer program instructions are run by a processor, the processor is enabled to perform the steps, of the method according to the embodiments of the present disclosure, that are described in the "exemplary method" part of this specification.

Basic principles of the present disclosure are described above in combination with specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details described above are merely for examples and for ease of understanding, rather than limitations. The details described above do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner.

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure are decomposable and/or recombinable. These decompositions and/or recombinations shall be regarded as equivalent solutions of the present disclosure.

What is claimed is:

1. A control method for safety boot of a chip, comprising:
   detecting a communication handshaking signal between a hardware security module and a first memory;
   determining a valid control signal based on the communication handshaking signal;
   acquiring a decryption result transmitted by the hardware security module through a bus connected to the hardware security module, in response to the valid control signal;
   determining, at a preset stage of a chip boot process, first mirror data to be checked at the preset stage and first check code corresponding to the first mirror data, from the decryption result obtained from the hardware security module;
   determining second check code based on the first mirror data;
   comparing the second check code with the first check code to obtain a comparison result;
   determining an integrity check result of the first mirror data based on the comparison result; and
   executing, based on the integrity check result, a safety boot program corresponding to the first mirror data at the preset stage.

2. The control method according to claim 1, further comprising: before the determining, at a preset stage of a chip boot process, first mirror data to be checked at the preset stage and first check code corresponding to the first mirror data, from a decryption result obtained by the hardware security module,
   loading encrypted mirror data corresponding to the preset stage from an external storage device; and
   transmitting the encrypted mirror data to the hardware security module, to enable the hardware security module to decrypt the encrypted mirror data to obtain the decryption result.

3. The control method according to claim 2, further comprising:
   storing the decryption result to the first memory,
   wherein the comparing the second check code with the first check code to obtain a comparison result comprises:
   writing a completion interrupt signal into a first register;
   acquiring the first check code from the first memory in response to that the completion interrupt signal in the first register is detected; and
   comparing the second check code with the first check code to obtain the comparison result.

4. The control method according to claim 1, wherein the determining second check code based on the first mirror data includes:
   acquiring pre-configured check configuration information, wherein the check configuration information includes check algorithm information corresponding to the preset stage; and
   generating the second check code of the first mirror data based on the check configuration information and the first mirror data.

5. The control method according to claim 1, further comprising before the determining, at a preset stage of a chip boot process, first mirror data to be checked at the preset stage and first check code corresponding to the first mirror data, from the decryption result obtained by the hardware security module,
   acquiring an initial boot program from a read-only memory;
   executing the initial boot program to obtain initial check configuration information;
   performing initial configuration on the safety boot of the chip based on the initial check configuration information; and
   entering the preset stage of the chip boot process in response to completion of the initial configuration.

6. A control apparatus for safety boot of a chip, comprising:
   a hardware acceleration module, connected to a hardware security module, and configured to determine, at a preset stage of a chip boot process, first mirror data to be checked at the preset stage and first check code corresponding to the first mirror data, from a decryption result obtained from the hardware security module, and to determine second check code based on the first mirror data;
   a first processing module, connected to the hardware acceleration module, and configured to compare the second check code with the first check code to obtain a comparison result;

a second processing module, configured to determine an integrity check result of the first mirror data based on the comparison result; and a third processing module, configured to execute, based on the integrity check result, a safety boot program corresponding to the first mirror data at the preset stage, wherein the hardware acceleration module comprises a bus monitor and a check code generator, wherein the bus monitor is connected to the hardware security module by a bus bypass, and configured to detect a communication handshaking signal between the hardware security module and a first memory, and transmit a valid control signal to the check code generator based on the communication handshaking signal, wherein the valid control signal is used for notifying the check code generator to start to collect the decryption result transmitted by the hardware security module; and wherein the check code generator is connected to the bus monitor and further connected to the hardware security module by a bus bypass, and configured to collect, in response to the valid control signal from the bus monitor, the decryption result transmitted by the hardware security module through a bus connected to the hardware security module, and determine the second check code based on the first mirror data in the decryption result.

7. The control apparatus according to claim 6, further comprising:

a load module configured to load encrypted mirror data corresponding to the preset stage from an external storage device; and the hardware security module, connected to the load module, and configured to decrypt the encrypted mirror data to obtain the decryption result.

8. The control apparatus according to claim 7, further comprising the first memory, wherein the hardware security module is further configured to store the decryption result into the first memory, wherein the hardware acceleration module further includes a first register, connected to the first processing module, and configured to store a completion interrupt signal, wherein the hardware acceleration module is further configured to write the completion interrupt signal into the first register after determining the second check code, to notify the first processing module that the second check code has been generated; and wherein the first processing module is further configured to acquire the first check code from the first memory in response to that the completion interrupt signal in the first register is detected, and compare the second check code with the first check code to obtain the comparison result.

9. The control apparatus according to claim 6, further including a second register, connected to the hardware acceleration module, and configured to store check configuration information, wherein the check configuration information includes check algorithm information corresponding to the preset stage; and wherein the hardware acceleration module is further configured to acquire the check configuration information from the second register, and generate the second check code of the first mirror data based on the check configuration information and the first mirror data.

10. The control apparatus according to claim 6, further including:

a second memory, configured to store an initial boot program and initial check configuration information for the hardware acceleration module; and an initial processing module, configured to execute the initial boot program stored by the second memory to enter an initial boot stage, acquire the initial check configuration information from the second memory based on the initial boot program, and perform initial configuration on the hardware acceleration module based on the initial check configuration information to enter the preset stage of the chip boot process.

11. An electronic device, comprising:

a processor; and a memory, configured to store a processor-executable instruction, wherein the processor is configured to read the executable instruction from the memory, and execute the instruction to implement a control method for safety boot of a chip, wherein the control method comprises:

detecting a communication handshaking signal between a hardware security module and a first memory;

determining a valid control signal based on the communication handshaking signal;

acquiring a decryption result transmitted by the hardware security module through a bus connected to the hardware security module, in response to the valid control signal;

determining, at a preset stage of a chip boot process, first mirror data to be checked at the preset stage and first check code corresponding to the first mirror data, from the decryption result obtained from the hardware security module;

determining second check code based on the first mirror data;

comparing the second check code with the first check code to obtain a comparison result;

determining an integrity check result of the first mirror data based on the comparison result; and executing, based on the integrity check result, a safety boot program corresponding to the first mirror data at the preset stage.

12. The electronic device according to claim 11, wherein the control method further comprises: before the determining, at a preset stage of a chip boot process, first mirror data to be checked at the preset stage and first check code corresponding to the first mirror data, from the decryption result obtained by the hardware security module, loading encrypted mirror data corresponding to the preset stage from an external storage device; and transmitting the encrypted mirror data to the hardware security module, to enable the hardware security module to decrypt the encrypted mirror data to obtain the decryption result.

13. The electronic device according to claim 12, wherein the control method further comprises:

storing the decryption result to the first memory, wherein the comparing the second check code with the first check code to obtain a comparison result comprises:

writing a completion interrupt signal into a first register;

acquiring the first check code from the first memory in response to that the completion interrupt signal in the first register is detected; and comparing the second check code with the first check code to obtain the comparison result.

14. The electronic device according to claim 11, wherein the determining second check code based on the first mirror data includes:
- acquiring pre-configured check configuration information, wherein the check configuration information includes check algorithm information corresponding to the preset stage; and
- generating the second check code of the first mirror data based on the check configuration information and the first mirror data.

15. The electronic device according to claim 11, wherein the control method further comprises: before the determining, at a preset stage of a chip boot process, first mirror data to be checked at the preset stage and first check code corresponding to the first mirror data, from the decryption result obtained by the hardware security module,
- acquiring an initial boot program from a read-only memory;
- executing the initial boot program to obtain initial check configuration information;
- performing initial configuration on the safety boot of the chip based on the initial check configuration information; and
- entering the preset stage of the chip boot process in response to completion of the initial configuration.

16. The electronic device according to claim 11, comprising a control apparatus for safety boot of a chip, wherein the control apparatus comprises:
- a hardware acceleration module, connected to the hardware security module, and configured to determine, at the preset stage of the chip boot process, the first mirror data to be checked at the preset stage and the first check code corresponding to the first mirror data, from the decryption result obtained from the hardware security module, and to determine the second check code based on the first mirror data;
- a first processing module, connected to the hardware acceleration module, and configured to compare the second check code with the first check code to obtain the comparison result;
- a second processing module, configured to determine the integrity check result of the first mirror data based on the comparison result; and
- a third processing module, configured to execute, based on the integrity check result, the safety boot program corresponding to the first mirror data at the preset stage.

* * * * *